US 9,841,867 B2

(12) United States Patent
Vertegaal et al.

(10) Patent No.: US 9,841,867 B2
(45) Date of Patent: Dec. 12, 2017

(54) COMPUTING APPARATUS FOR DISPLAYING A PLURALITY OF ELECTRONIC DOCUMENTS TO A USER

(71) Applicants: Roel Vertegaal, Kingston (CA); Paul Strohmeier, Vienna (AT); Aneesh Pradyumna Tarun, Kinston (CA)

(72) Inventors: Roel Vertegaal, Kingston (CA); Paul Strohmeier, Vienna (AT); Aneesh Pradyumna Tarun, Kinston (CA)

(*) Notice: Subject to any disclaimer, the term of this patent is extended or adjusted under 35 U.S.C. 154(b) by 909 days.

(21) Appl. No.: 13/761,030

(22) Filed: Feb. 6, 2013

(65) Prior Publication Data

US 2014/0195898 A1 Jul. 10, 2014

(30) Foreign Application Priority Data

Jan. 4, 2013 (GB) .................................. 1300138.3

(51) Int. Cl.
| | |
|---|---|
| *G06F 3/048* | (2013.01) |
| *G06F 3/0481* | (2013.01) |
| *G06F 3/0488* | (2013.01) |
| *G06F 3/041* | (2006.01) |
| *G06F 3/0483* | (2013.01) |

(52) U.S. Cl.
CPC ............ *G06F 3/0481* (2013.01); *G06F 3/041* (2013.01); *G06F 3/0483* (2013.01); *G06F 3/0488* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,831,527 A | * | 11/1998 | Jones, II ............. | A63F 3/00157 273/138.1 |
| 9,031,961 B1 | * | 5/2015 | Cabanero .......... | G06F 17/30386 704/200 |
| 2004/0046784 A1 | * | 3/2004 | Shen ...................... | G06F 3/048 715/733 |

(Continued)

FOREIGN PATENT DOCUMENTS

| | | |
|---|---|---|
| EP | 2339573 A2 | 6/2011 |
| EP | 2339573 | 11/2011 |

(Continued)

OTHER PUBLICATIONS

ZYTRONIC "Projected Capacitive Touch Technology" retrieved from the internet Nov. 12, 2015 http://www.zytronic.co.uk.

(Continued)

*Primary Examiner* — Hien Duong
(74) *Attorney, Agent, or Firm* — Hamilton, DeSanctis & Cha (57) ABSTRACT

Apparatus for displaying a plurality of electronic documents to a user. The apparatus comprising a desk having a plurality of proximity zones which comprise at least a first proximity zone which is close to a user of the apparatus and at least a second proximity zone which is further away from said user; at least one display device comprising a display for displaying one of said plurality of electronic documents and at least one sensing device for determining the proximity zone within which said at least one display device is located. The functionality of said display device is determined by the proximity zone within which it is located.

40 Claims, 3 Drawing Sheets

(56) References Cited

U.S. PATENT DOCUMENTS

| | | | |
|---|---|---|---|
| 2004/0048511 A1* | 3/2004 | Dayan | H01R 13/22 439/493 |
| 2005/0127601 A1* | 6/2005 | Giegerich | A63F 7/06 273/108.1 |
| 2006/0031786 A1* | 2/2006 | Hillis | G06F 3/04883 715/863 |
| 2006/0068870 A1* | 3/2006 | Crawford, III | G07F 17/32 463/13 |
| 2006/0125799 A1* | 6/2006 | Hillis | G06F 3/011 345/173 |
| 2006/0287066 A1* | 12/2006 | Crawford, III | G07F 17/32 463/25 |
| 2006/0294247 A1* | 12/2006 | Hinckley | G06F 3/038 709/228 |
| 2007/0102876 A1* | 5/2007 | Giegerich | A63F 7/066 273/108.1 |
| 2007/0124503 A1 | 5/2007 | Ramos et al. | |
| 2007/0247422 A1* | 10/2007 | Vertegaal | G06F 3/017 345/156 |
| 2008/0055271 A1 | 3/2008 | Yamaguchi et al. | |
| 2008/0150919 A1 | 6/2008 | Kanamaru | |
| 2008/0201315 A1* | 8/2008 | Lazier | G06F 3/04812 |
| 2008/0281851 A1* | 11/2008 | Izadi | G06F 17/30056 |
| 2009/0079765 A1* | 3/2009 | Hoover | G06F 3/0481 345/660 |
| 2009/0106667 A1* | 4/2009 | Lyle | G06F 3/0488 715/750 |
| 2009/0131151 A1* | 5/2009 | Harris | G07F 17/32 463/22 |
| 2009/0153342 A1 | 6/2009 | Thorn | |
| 2009/0160874 A1 | 6/2009 | Su | |
| 2009/0209293 A1* | 8/2009 | Louch | H04M 1/6041 455/566 |
| 2009/0309846 A1* | 12/2009 | Trachtenberg | G06F 3/017 345/173 |
| 2010/0045705 A1* | 2/2010 | Vertegaal | A47G 19/2227 345/661 |
| 2010/0094705 A1* | 4/2010 | Sitbon | G06Q 30/0251 705/14.49 |
| 2010/0113148 A1* | 5/2010 | Haltovsky | A63F 13/31 463/30 |
| 2010/0141605 A1 | 6/2010 | Kang et al. | |
| 2010/0302454 A1* | 12/2010 | Epstein | H04N 5/268 348/705 |
| 2011/0083111 A1* | 4/2011 | Forutanpour | G06F 1/1694 715/863 |
| 2011/0197147 A1* | 8/2011 | Fai | G06F 1/1639 715/753 |
| 2011/0249024 A1* | 10/2011 | Arrasvuori | G06F 3/017 345/629 |
| 2011/0270824 A1* | 11/2011 | Morris | G06F 17/30991 707/722 |
| 2012/0036479 A1* | 2/2012 | Kasahara | G06F 3/0488 715/825 |
| 2012/0042288 A1* | 2/2012 | Liao | H04N 1/00129 715/863 |
| 2012/0100901 A1* | 4/2012 | Kirsch | A63F 1/18 463/11 |
| 2012/0115549 A1* | 5/2012 | Kim | H02J 7/0047 455/566 |
| 2012/0144347 A1* | 6/2012 | Jo | G06F 3/04883 715/863 |
| 2012/0208514 A1* | 8/2012 | Park | G06F 3/0484 455/418 |
| 2013/0103797 A1* | 4/2013 | Park | H04L 65/60 709/217 |
| 2013/0111369 A1* | 5/2013 | Pasquero | G06F 3/0481 715/761 |
| 2013/0111370 A1* | 5/2013 | Pasquero | G06F 3/0481 715/761 |
| 2013/0283193 A1* | 10/2013 | Griffin | G06F 3/1446 715/761 |
| 2014/0026098 A1* | 1/2014 | Gilman | G06F 3/0482 715/810 |
| 2014/0106875 A1* | 4/2014 | Nguyen | G07F 17/3218 463/31 |
| 2014/0143682 A1* | 5/2014 | Druck | G06Q 10/107 715/752 |
| 2015/0169091 A1* | 6/2015 | Ho | G06F 3/044 345/173 |

FOREIGN PATENT DOCUMENTS

| | | |
|---|---|---|
| JP | 2005/202208 | 7/2005 |
| JP | 2006/031373 | 2/2006 |
| JP | 2006030563 | 2/2006 |
| JP | 2007274330 | 10/2007 |
| JP | 2009/271800 | 11/2009 |
| WO | WO 2009/074887 | 6/2009 |
| WO | WO 2011/124746 | 10/2011 |

OTHER PUBLICATIONS

Ascension Technology Corp. "Integrate Electromagnetic Tracking Unit Into your Simulation Systems . . . " retrieved from the internet Nov. 12, 2015 http://www.ascension-tech.com/medica.

Agrawala "Keepin' it Real: Pushing the Desktop Metaphor with Physics, Piles and the Pen" CHI 06, ACM Press pp. 1283-1292.

Baudisch "Keeping Things in Context: a Comparative Evaluation of Focus Plus Context Screens, Overviews, and Zooming" CHI, ACM (2002) pp. 259-266.

Bier Toolglass and Magic Lenses: the See-Through Interface Siggraph 1993 pp. 73-80.

Bush "As We May Think" The Atlantic Monthly 176,1 1945 pp. 101-108.

Cockburn "Evaluating the Effectiveness of Spatial Memory in 2D and 3D Physical and Virtual Environments" CHI (2002) p. 203.

Cockburn "Revisiting 2D and 3D Implications on Spatial Memory" AUIC (2004) pp. 25-31.

Fitts "The Information Capacity of the Human Motor Apparatus in Controlling the Amplitude of Movement" J EXP Phychol 47, 6 (1954) pp. 381*391.

Fitzmaurice "Situated Information Spaces and Spatially Aware Palmtop Computers" Communications of the ACM, 36, 7 (1993).

FlexPoint Inc. retrieved from the Internet Nov. 12, 2015 http://www.flexpoint.com.

Girouard "DisplayStacks: Interaction Techniques for Stacks of Flexible Thin-Film Displays" CHI '12 (2012) ACM NY, NY pp. 2431-2440.

Greenberg "Proxemic Interactions the new Ubicomp?" Interactions, vol. 18, 1 (2011) pp. 42-50.

Guimbretiere "Paper Augmented Digital Documents" UIST vol. 5, 2 (2003) pp. 51-60.

Hinckley "Stitching: Pen Gestures That Span Multiple Displays" AVI (2004) pp. 23-31.

Hinckley "Pen + Touch = New Tools" UIST, (2010), pp. 27-36.

Holman "PaperWindows: Interaction Techniques for Digital Paper" CHI (2005) pp. 591-599.

Khalilbeigi "Interaction Techniques for Hybrid Piles of Documents on Interactive Tabletops" CHI extended abstracts (2010) p. 3943.

Lahey "PaperPhone: Understanding the Use of Bend Gestures in Mobile Devices with Flexible Electronic Paper Displays" CHI (2011).

Lee "Foldable Interactive Displays" UIST (2008) p. 287.

Luff "Only Touching the Surface: Creating Affinities Between Digital Content and Paper" CSCW (2004) p. 523.

MacKay "The Missing Link: Augmenting Biology Laboratory Notebooks" UIST (2002).

Merril "Siftables: Towards Sensor Network User Interfaces" TEI (2007) pp. 75-78.

Mine "Moving Objects in Space: Exploiting Proprioception in Virtual-Environment Interaction" SIGGRAPH (1997).

Plastic Logic Inc. retrieved from the Internet Nov. 12, 2015, http:www.plasticlogic.com (2012).

(56) References Cited

OTHER PUBLICATIONS

Reilly "Marked-up Maps: Combining Paper Maps and Electronic Information Resources" Personal and Ubiquitous Computing vol. 10, 4 (2005) pp. 215-226.
Rekimoto "Pick-and-Drop: A Direct Manipulation Technique for Multiple Computer Environments." UIST (1997) pp. 31-39.
Rekimoto "Data Tiles" CHI (2001) pp. 269-276.
Rohs "Interaction with Magic Lenses: Real-World Validation of a Fitts' Law Model" CHI (2011) pp. 2725-2728.
Schwesig "A Bendable Computer" CHI (2004) pp. 263-270 "Gummi: A Bendable Computer".
Sellen "The Myth of the Paperless Office" MIT Press, 2003.
Terrenghi "Affordances for Manipulation of Physical Versus Digital Media on Interacive Surfaces" CHI (2007) pp. 1157-1166.
Vertigaal "Organic User Interfaces: Introduction to Special Issue" Comm of the ACM vol. 51, 6 (2008) pp. 26-30.
Ullmer "Token+Constraint Systems for Tangible Interaction with Digital Information" TOCHI vol. 12, 1 (2005) pp. 81-118.
Wellner "Interacting with Paper on the DigitalDesk" Communications of the ACM vol. 36, 7 (1993) pp. 87-96.
Wightman "Bendflip: Examining Input Techniques for Electronic Book Readers with Flexible Form Factors" INTERACT (2011).

\* cited by examiner

COMPUTING APPARATUS FOR DISPLAYING A PLURALITY OF ELECTRONIC DOCUMENTS TO A USER

CROSS REFERENCE TO RELATED APPLICATION

The present application claims priority to British Patent Application No. GB 1300138.3 filed Jan. 4, 2013. The entirety of the aforementioned reference is incorporated herein by reference for all purposes.

FIELD OF THE INVENTION

This invention relates to a computing apparatus incorporating a plurality of displays, particularly electrophoretic thin-film displays.

BACKGROUND OF THE INVENTION

A long-standing debate in user interface research is the tradeoff of benefits between physical and digital user interface objects. In particular, the vision of a physical desktop computing apparatus based on the way office workers use paper documents has been an enduring research goal. One of the reasons for the longevity of paper, according to Sellen and Harper, is that it provides tactile-kinesthetic feedback when organizing and navigating information that is not available in traditional digital windowing environments. Paper, as a physical medium, is also thin, lightweight and portable. It provides 3D spatial organization of information, while enabling concurrent access to multiple streams of information.

On the other hand, Graphical User Interfaces (GUIs) provide superior opportunities for on-the-fly electronic manipulation and updating of information over paper. However, there are three major limitations of the GUI, as compared to paper documents: (1) users are severely restricted in the way they concurrently manipulate and organize multiple windows, particularly in cases where windows obscure each other; (2) spatial manipulation of windows is defined and limited by screen size; and (3) users cannot apply spatial memorization skills for GUI-based document retrieval as effectively as they can in real, physical, environments.

Hence, there exists a need in the art for enhanced approaches.

SUMMARY OF THE INVENTION

According to a first aspect of the invention, there is provided apparatus for displaying a plurality of electronic documents to a user, the apparatus comprising:
a desk having a plurality of proximity zones which comprise at least a first proximity zone which is close to a user of the apparatus and at least a second proximity zone which is further away from said user;
at least one display device comprising a display for displaying one of said plurality of electronic documents and
at least one sensing device for determining the proximity zone within which said at least one display device is located wherein the functionality of said display device is determined by the proximity zone within which it is located.

Other features are set out below and in the dependent claims and apply to both aspects of the invention where appropriate.

The apparatus may comprise a plurality of display devices wherein the functionality of each display device of said plurality of display devices is determined by the proximity zone within which it is located. The at least one sensing device may determine the proximity of each display device to the other of said plurality of display devices.

Depending on the proximity zone within which each display device is location, the display of each display device may display no documents, part of a document, a single document or multiple documents (e.g. tabbed).

The or each display may be a thin-film display, such as, for example, an electrophoretic display. None of the prior art paper computer systems described above deploy functioning thin-film electronic paper displays. The emerging technology of thin-film flexible displays [18] presents an opportunity to merge the physical world of paper with the digital world of information. The display may be an organic user interfaces [32] which may be a non-flat, flexible, tactile, high-resolution display interface. The flexible display may be sufficiently thin to approximate paper-like interactions, and may be sufficiently light to allow for efficient spatial interactions between displays. While research on flexible display interfaces has pursued the embodiment of digital data on paper [16, 18], this research has mostly focused on the usability of single and small display interactions.

By contrast, in the present invention, the use of multiple display devices allows multi-display large format interactions. By using such displays, the invention may be termed Paperdesk and is an electronic paper computer that allows physical manipulation of digital information using multiple flexible electrophoretic displays embodies on a physical desk. The apparatus combines the malleability of electronic windows with the tactile-kinesthetic and 3D spatial manipulability of paper documents. In the apparatus, each graphical window may be represented by a fully functional, paper-sized 10.7" diagonal thin-film high resolution flexible electrophoretic display [24].

The apparatus may use context aware window management techniques that allow for interactions with many documents represented on many physical displays, through relative movement of those displays. Use of multiple displays allows for virtually unlimited screen real estate spread over large work areas.

Each display device represents the basic component of the apparatus and the display may be termed a token. Token and constraint systems [33] classify physical objects as tokens manipulated under a set of space-based constraints to query data and execute procedures. In the present invention, each display may be constrained dynamically in terms of its placement to other physical document windows, and absolutely in terms of proximity to the user. This approach-defining constraints dynamically in terms of tokens that are themselves dynamic—has been explored in other systems such as Siftables [22], and Data-tiles [27]. However, the present invention extends this to include paper-inspired interactions with context-aware physical windows, in which each window is represented by one display. Each display may be termed a displaywindow.

The apparatus may be document centered and requires a physical instantiation (representation) of each document on a display. Each display may have multiple electronic documents. Furthermore, each electronic document may have a single or multiple pages. However, the apparatus may be configured such that at no point is an electronic document not represented on at least one display. This allows users to move digital documents by moving displays physically and tangibly through spatial arrangement on the desk.

Each display device may be aware of its own location on the desk and may be aware of its location relative to and within other displays. This allows smart context-aware operations between displaywindows that depend on how close they are to the user or other displaywindows.

Typically, screen real estate is limited in desktop GUIs and thus windows are typically stacked on the desktop in a virtual z dimension, obscuring one another. In the present apparatus, use of multiple displays means that real estate is not limited to a single display or even to a single desktop.

The functionality of each display device is determined by the proximity of the display device to a user. For example, each display device may vary the resolution of a document's information based on physical proximity to the user. In other words, the level of detail displayed by the display device may change based on the proximity zone within which the device is located. Display devices that are furthest away from the user may thus represent file thumbnails that are not in use. Displaywindows that are closest to a user may represent a full page from a document. Displaywindows in between these extremes may represent overviews.

Other functionality may also be determined by the proximity of the display device to the user. For example, the display device may be configured to allow a user to edit a document displayed on said display when the display device is within the first proximity zone. The display device may be configured to lock, i.e. to prevent accidental editing of, a document when the display device is within the second (or subsequent) proximity zone. The display device may be configured to turn off said display when the display device is within the second or third proximity zone.

The use of proximity to activate document views also requires consideration of the top or focus window. The closer a display is to the user, the more focus it is expected to receive and the more receptive to input it becomes. According to Sellen and Harper [30], users often use proximity when dealing with paper documents. Hot paper documents are in immediate use, serve multiple concurrent purposes and are in close proximity to the user. Warm paper documents have served or are about to serve an immediate need, but should not be in the way of handling hot documents. Cold paper documents represent archived documents that are not in immediate use and are typically filed away from the user. In the present apparatus, these concepts of hot, cold and warm zones are translated into a proxemics design [12] in which displays may be brought in and out of task focus by physically moving them towards or away from the user. Sellen and Harper [30] also suggest that to allow for easy multitasking, every document that is within close proximity of the user should be active for input, with the most active windows beings the ones held by the user.

Thus, the first proximity zone may comprise all areas on the desk within an arm's length, i.e. within approximately 70 cm of the user. The at least one display device may also be within the first proximity zone when the at least one display device is being held by the user. The first proximity zone may be termed a hot zone. Where there is only one further proximity zone, this may comprise all areas outside the first zone and may be termed a cold or warm zone. Alternatively, additional proximity zones may be defined with the zones defining bands of increasing distance away from the user and terms such as warm, cool etc being used to designate intermediate zones. For example, the second proximity zone may comprise all areas on the desk between approximately 70 cm to 110 cm away from the user and may be termed a warm zone. A third proximity zone may be all areas outside the second proximity zone and may be termed a cold zone.

The device may comprise an indicator to show within which proximity zone each display device is located. For example, the indicator may comprise a first colored light (e.g. green) for said first proximity zone and a second colored light (e.g. amber) for said second proximity zone. The indicator may be turned off when the device is within the outermost proximity zone.

The apparatus may further comprise a keyboard, e.g. for a user to input text. The sensing device may determine which display device is closest to the keyboard, wherein actions on the keyboard are input to said closest display device. Thus, the sensing device may comprise a sensor on the keyboard to determine its location on the desk. The keyboard may also comprise an input for linking said keyboard to a linked display device, wherein actions on the keyboard are input to said linked display device.

The display device may comprise a plurality of layers which may include some or all of a touch screen layer, a display layer, a bending sensor layer, a position sensor layer and a processor layer. The layers may be flexible or at least semi-flexible. For example, the display layer may be a thin-film display as described above.

A flexible device may incorporate a bending sensor for sensing bending of said flexible display device. The bending sensor may sense both full body flexing of the device and/or may sense corner bending of the device. Said display device may be configured to enlarge content displayed on said display device in response to full body flexing. In response to bending a corner of said flexible display device, said display device may be configured to display a subsequent page of a document which is being displayed on said display. Alternatively, different actions may be initiated by the bending actions.

The display device may comprise a position sensor which may detect the position of the display device in six degrees of freedom. Each position sensor may form part of the sensing device for determining in which zone each display device is located. The position sensor may also be used for determining the location of the display device relative to other display devices and/or the keyboard. The sensing device may further comprise a sensing processor mounted to the desk to process data received from the position sensors. The position sensor may be an electromagnetic sensor.

The display device may comprise a processor. The processor may be configured to receive and process all data from some or all of various inputs, e.g. the touch screen, the bending sensor and/or the position sensor. Alternatively, the processor may be configured to maintain only basic functionality for the display device, e.g. to drive and power the display.

The apparatus may further comprise a separate or host processor. The host processor may be mounted to the desk. The host processor may be configured to receive and process inputs from the or each display device. For example, the host processor may receive data from the or each position sensor to determine the location of each display device and/or keyboard. Alternatively, where a sensing processor is also used, the host processor may receive the preprocessed data from the sensing processor to determine the locations. Similarly, processing the nature of the bending of a flexible device and determining subsequent action by the display may be done at the host processor. The bending sensor may be configured to send bending data to the host processor and wherein the host processor is configured to process said bending data and send instructions to the display device to alter the display based on said processed bending data. Use of such a host processor reduces the processing power required by each display device and may reduce the cost and/or weight and/or increase the flexibility of such devices.

The display device may comprise a user input in the form of a touch sensitive screen, e.g. a capacitive touch screen. The touch sensitive screen may be connected to an activator whereby when a user holds the display device and touches the display device to a second display device, the activator activates the touch sensitive screen of the second display device. For example, for a capacitive touch screen the activator may transfer the capacitance of a user and may thus comprise a metal projection, e.g. a metalized tip at one corner of the display device which is connected to the touch screen via a wire or similar conductive connector.

The at least one display device may comprise a proximity sensor for determining when the at least one display device is adjacent a second display device and wherein the second display device comprises a display for displaying information relating to a document on the at least one display device when the second display device is adjacent the at least one display device. The proximity sensor may be in the form of a touch sensitive screen and activator as described above.

According to a second aspect of the invention, there is provided Apparatus for displaying a plurality of electronic documents to a user, the apparatus comprising:
a first display device comprising a first display for displaying one of said plurality of electronic documents,
a second display device comprising a second display and an activation system for determining when said second display device is adjacent said first display device and activating said second display to display information relating to said document on the first display when the second display device is adjacent the first display device.

The activation system may comprise a touch sensor on the first display device and an activator on the second display device wherein the activator for activating the touch sensor when a user is holding the second display device against the first display device. The touch sensitive screen and activator may be as described above.

The first and second display devices may be incorporated in Apparatus having a desk with a plurality of zones and the functionality of the first and second display devices may be dependent on the zone as described above. Accordingly, all the features described above in relation to the zoning and the components of the display devices apply equally to the second aspect of the invention.

The following features may also apply to both aspects of the invention when the second display device is adjacent the first display device. The first display device may display a thumbnail and the second display device may display a full screen preview of the thumbnail. Alternatively, the first display device may display a document comprising a URL and the second display device may display a full screen preview of the webpage represented by the URL. Alternatively, the first display device and the second display device may display different portions of a map.

BRIEF DESCRIPTION OF THE DRAWINGS

These and other aspects of the invention will now be further described, by way of example only, with reference to the accompanying figures in which:

FIG. 1b is a schematic view of the apparatus of FIG. 1a;

FIG. 2a is view of a display from the apparatus of FIG. 1a;

FIG. 2b is a view of two displays from the apparatus of FIG. 1a, and

FIG. 3 is an exploded view showing the components of a display from the apparatus of FIG. 1a.

DETAILED DESCRIPTION OF THE INVENTION

It has been discovered that there is a need for an apparatus that combines tangible, paper-like interactions with digital documents.

The idea of providing paper-based interaction with digital information is far from new: it was the core idea behind Memex [5] which inspired the GUI. Wellner's DigitalDesk [34] was one of the first systems to implement such seamless interaction between physical and digital mediums through digital projection on paper. Since then, many tabletop research projects have explored the coexistence of paper and digital information [15, 17]. While these systems provide various affordances of paper, they are often limited in their interactions, and do not take advantage of the spatiality of content beyond the 2D surface of a desk.

DigitalDesk [34] was one of the first physical paper computers. It seamlessly merged interactions between physical paper and digital documents on a physical desk. Users were able to select date from paper documents and copy it into digital documents. In PaperWindows, Holman et al. [16] created a windowing environment that simulated fully wireless, full-color digital paper. Holman projected digital documents on physical paper, allowing for input and output directly on the flexible display. PaperWindows demonstrated use of gestural inputs such as hold, collate, flip and bend. Similarly, Lee et al [19] used image projection on foldable materials to simulate flexible displays with variable form factors and dimensions.

Research in thin-film display interactions started with paper mockups, bendable substrates on rigid devices and projected flexible displays [16, 29]. With the recent availability of working flexible displays, projects like PaperPhone [18] explored new interaction techniques such as bending as an interaction paradigm. DisplayStacks [11] is one of the few papers to explore interaction techniques for stacking multiple functional E Ink displays. However, it featured only a small set of smartphone sized displays, and presented a limited set of interactions between screens based on stacking metaphors.

Over the past decades researches have also explored the integration of digital content with a range of physical media, from paper on desks [16, 34] to notebooks [21] and maps [25]. A number of relationships between digital and physical media have been studied, including designing physical media explicitly to support querying of digital content [25], or synchronizing digital and physical manifestations of the same document [13]. However, there remain few universally accepted design principles for such integrations [20].

Khalibeigi et al [17] worked on a tabletop apparatus that tracked various configurations of physical documents, as did Hinckley et al [15]. Interaction with hybrid physical-digital documents can occur by pointing at [9], writing on [13] or manipulating [15] physical media, by moving a digital display in relation to physical documents (e.g. in magic lens interactions [4], or by interacting with the GUI superimposed on physical media [15] or on a separate digital device [9]. In several cases the media itself services as both display and input: e.g., Reilly et al. [25] find that users tend to choose a corner of the media to facilitate precise pointing and to reduce occlusion.

Interaction paradigms for 3-D virtual environments have tried to exploit e.g. centric perspective and proprioception [23] for target acquisition. Prior work has illustrated greater effectiveness of a 2-D or 2.5-D workspace (either physical or virtual) over 3-D workspaces [2], in terms of both target acquisition performance [6] and in recall of item locations [7]. Cockburn and McKenzie suggest the superiority of a physical 2-D interface to a virtual one in terms of task efficiently and subjective performance measures [6]. When comparing physical and virtual interfaces, however, Terenghi et at. [31] observed faster puzzle solving using physical objects, and equal performance for sorting. Their participants also preferred the physical implementation. In addition, they exhibited significantly more bimanual interaction in the physical interface conditions. The authors also observe physical and virtual tabletop activities, related in part to the ability to hold and place multiple physical artifacts.

Thus, the first (or hot) proximity zone may comprise all areas on the desk within approximately 70 cm of the user. The at least one display device may also be within the first proximity zone when the at least one display device is being held by the user. The second (warm) proximity zone may comprise all areas on the desk between approximately 70 cm to 110 cm away from the user. If there are only two zones, the second proximity zone may be the cold zone. Alternatively, a third proximity zone (cold zone) may be defined which is all areas beyond the second proximity zone. Further proximity zones may also be defined.

Figure 1A:
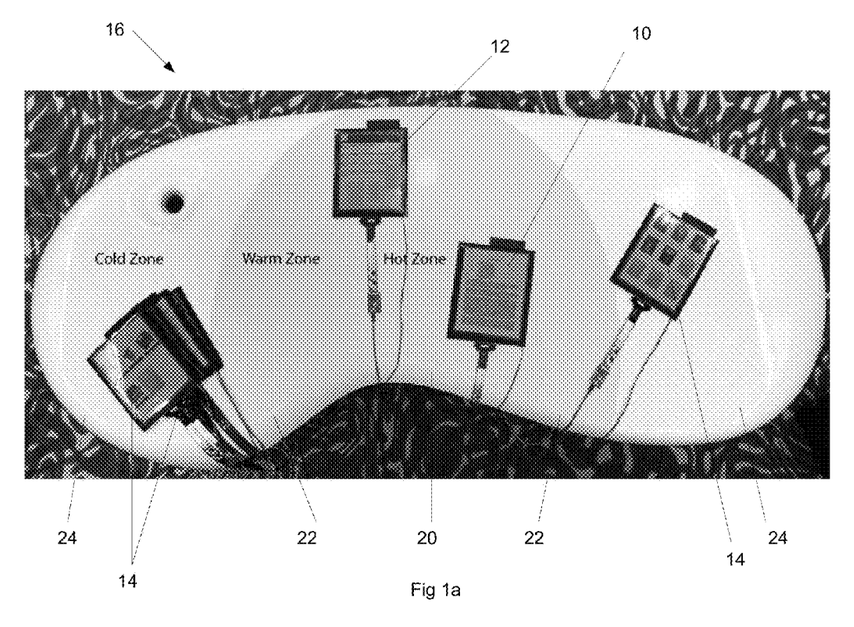
FIG. 1a is a plan view of Apparatus according to the present invention.
Figure 1B:
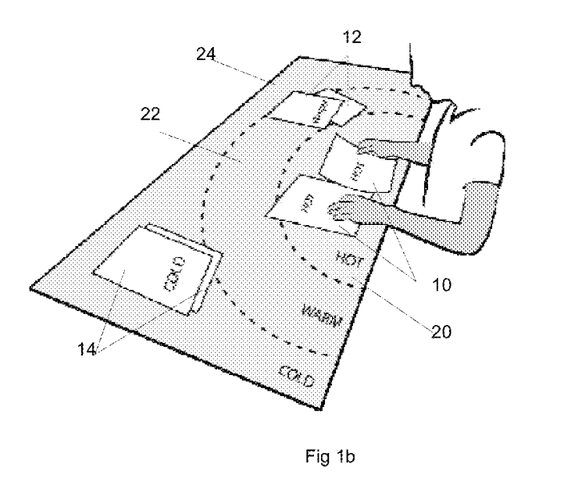

As shown in FIGS. 1a and 1b, the apparatus comprises a plurality of display devices 10, 12, 14 on a desk 16. In FIG. 1a, there are nine display devices with six display devices stacked on top of each other to one side of a desk and in FIG. 1b, there are six display devices. Thus, it will be appreciated that any number of display devices may be used and as explained in more detail together they form an electronic paper computer which may be termed paperdesk.

The desk shown in FIG. 1a is a thermoformed plastic desk that features no special augmentation. The desk is thus a surface for supporting the plurality of display devices when they are not being held by a user(s). The display devices may be tethered to a host processor, for example a 8-Core MacPro running Windows 7. The host processor may be placed underneath the desk and the desk may thus be considered to further comprise the host processor.

As explained in more detail with reference to FIG. 3, each display device may comprise a touch layer, a location sensor and a bend sensor and the host processor may process all input from these components. For example, the host PC may process touch input from the circuit on the display device, sending x, y touch events back to the display device. The host PC may also process all bend information, sending back discrete events to the displaywindow. The host processor may also handle communication between display devices, e.g., in case of co-location or focus and context pointing. This may thus reduce processing power requirements for the display devices themselves. The display devices may run all other application software completely self-contained and maintain their own state.

The apparatus may also comprise a processor/emitter (e.g. trakSTAR) which is also mounted underneath the desk and which preprocesses for the host PC, the sensor data received from the location sensor on the display device. The host PC may then send a 6 degrees of freedom coordinate back to the display device. The PC uses coordinate data from the touch screen and the location sensor to determine when to exchange data between displaywindows, for example, when performing a co-located copy.

The desk is divided into multiple zones based on the proximity of each zone to a user and wherein the functionality of the display is determined by the zone in which it is located. The location of each display relative to each zone is tracked, for example using an electro-magnetic tracker. A display may be within a zone when it is placed on the zone on the desk or when it is held in a user's hand above the zone. In the examples of FIGS. 1a and 1b there are three zones: the hot zone 20 which is close to the user and the warm zone 22 and the cold zone 24 both of which are further away from the user. In the hot zone, the display may allow full screen browsing and editing of documents. In the warm zone, the display may display thumbnail overviews and in the cold zone, the display may be used for filing documents.

Figure 2A:
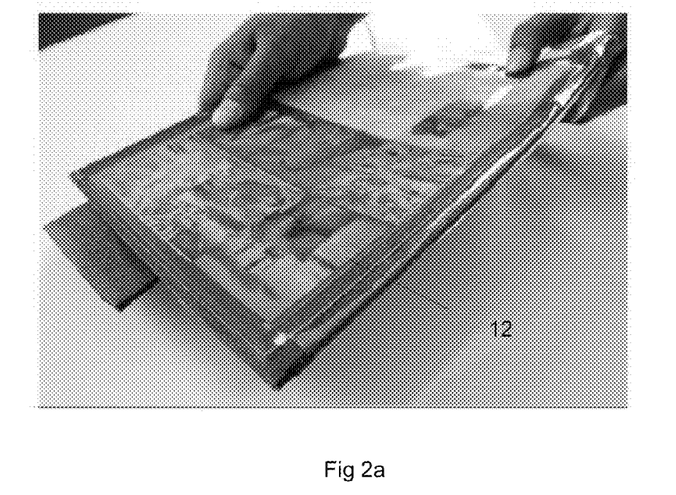
Figure 2B:
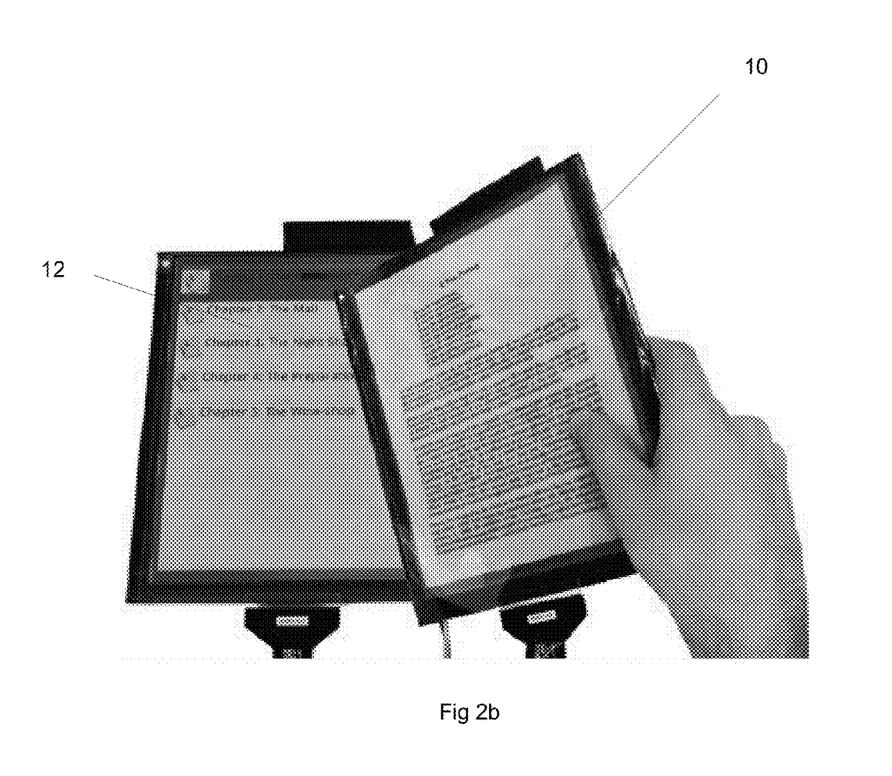

As described in more detail below, each display is a thin-film electrophoretic display which can be held in a user's hands as shown in FIG. 2a or FIG. 2b or placed on a physical desk as shown in FIGS. 1a and 1b. Each display may be approximately A4 or Letter sized. Each display may have touch screen capability and is flexible. Each display may be an Android computer.

The displays serve as electronic paper windows into computer documents. Each display may correspond in functionality to one window on a graphical user interface (GUI). Each display is thus termed a displaywindow to reflect the fact that it is a physical representation of one window per display. As explained in more detail below, users can interact with the apparatus by moving the displaywindow around their desk and can navigate and edit information on a displaywindow using touch input and simple bend operations [18]. For example, flicking the top right corner pages forwards or back allows a user to turn pages within a document and bending the displaywindow may allow a user to zoom in or out of the document.

As shown in FIG. 2b, users can also use a displaywindow as a magic lens [4] that points at another displaywindow, allowing them to pop up information on the top displaywindow detailing items displayed on the underlying displaywindow. For example, documents may be opened on a first displaywindow by pointing the first displaywindow at a file icon on a second displaywindow. The document represented by the file icon is then opened on the first displaywindow.

The effectiveness of having displays as windows is greatly reduced by the weight of the display [8]. Moving a stack of 10 tablets around one's desk does not rival the efficiency of moving paper documents. To move displaywindows around with the greatest efficiency, it is important that they are made of the most lightweight displays available.

The interaction techniques for the plurality of displays address the problem of windowing in Apparatus with many displays. As set out above, each display is the functional equivalent of a single GUI window. One challenge was that unlike GUIs, no user interface exists in the space between windows. This means the user interface lives among a collection of displays, rather than just within a single display. As such, we considered interactions with displaywindows as pertaining to one of two types: zone interactions and focus context interactions.

In traditional GUIs, windows are organized using a stacking metaphor: the most proximate window is the top or focus window which contains the active document that the user is working on. In the present invention, the displays (and hence the windows) are laid out on a physical desk with more real estate. Thus, stacking of windows need not be the dominant metaphor for task focus. Rather, and according to Sellen and Harper's analysis of paper document use, the focus or activity level of a window is determined by the proximity of a displaywindow to the user [30]. FIGS. 1a and 1b show three zones of proximity to the user, each pertaining to a different focus level: hot (within arm's reach, active document), warm (at arm's reach, locked or stacked document), and cold (outside arms reach, filed document).

Hot Zone

In this zone, displaywindows are either held by the user, or within immediate hand's reach of the user. They are the equivalent of the top window in GUIs. They contain active documents editable by the user via touch input or keyboard. When a displaywindow is moved into the hot zone an indicator shows that the display is within the hot zone. For example, the indicator may be a small LED in the top left corner of the display which turns green and which may indicate that documents displayed have become editable.

As set out above, the apparatus may be configured to vary the resolution of a document when the display is moved between proximity zones. However, when displays are moved to the hot zone, one option is that there is no immediate change to the view resolution. This allows users to examine the contents of warm and cold displaywindows without changing their view, at least till there is further input from a user. For example, users can use touch the display or bend the display to change view in the hot zone. For example, after moving a display from the warm zone to the hot zone, users can go from a thumbnail overview to a full screen view by bending the sides of the display outwards.

When display windows are moved in the other direction, i.e., from the hot zone to the warm zone, the apparatus may change the resolution of the document. For example the view changes to a thumbnail overview of the document in the warm zone and the document closes to show a file icon in the cold zone. Movement to the cold zone is the equivalent of closing a window in a GUI. Displaywindows remain hot until the user releases them in a warm or cold zone.

Warm Zone

In this zone, displaywindows are at arm's reach of the user. They are the equivalent of minimized windows, or windows stacked below the top window in a GUI. As such documents contained in warm displaywindows are locked, and not directly editable by the user. This allows them to be handled and placed in piles without the risk for spurious input. They do, however, respond to external events such as alerts, incoming files, emails or edits by remote users.

Whenever a displaywindow is moved to the warm zone, an indicator shows that this display is within the warm zone. For example, the indicator may be an LED in the top left corner of the display which turns amber.

As set out above, the apparatus may be configured to vary the resolution of a document when the display is moved between proximity zones. For example, when a displaywindow is moved from a cold zone to the warm zone, the documents in the cold displaywindow are opened into tabs displaying thumbnail overviews. This allows a convenient way of opening up multiple documents onto a single displaywindow. A user can select each tab by touch when the displaywindow is picked up (i.e. when the user moves the display to the hot zone). In another example, when the displaywindow is moved back to the cold zone from the warm zone, the tabs close to show a file icon. When a displaywindow in the hot zone is moved to a warm zone this may cause the displaywindow to show the thumbnail overview of its document. For example, if the user is browsing a full screen photo in an album in the hot zone, moving the display into the warm zone would cause it to display thumbnails of all photos in the album as shown in FIG. 2a.

When a document on a warm displaywindow receives an external update, an indicator may notify the user, e.g. the LED may start flashing amber to notify the user. For example, a user may keep her β-mail Inbox in a warm displaywindow displaying a list of recent emails. When a new email arrives, the indicator for the displaywindow starts blinking. Users can open the last received email by moving the displaywindow with the Inbox document into the hot zone and touching the email. Moving the displaywindow with the Inbox back into the warm zone closes the current email and moves the window back into its original list overview. The LED notification may stop blinking when the displaywindow is touched.

Cold Zone

In this zone, displaywindows are just outside of arm's reach of the user, yet easily accessible by leaning or reaching forward over the desk. Cold displaywindows allow storage of documents out of the way of the active task. They are equivalent to file folders in GUI filing systems. The cold zone provides users with an easy way to file and retrieve documents. Filed folders are not editable and only respond to touches by other displaywindows.

When a displaywindow is moved into the cold zone, this movement is shown by an indicator. For example an LED in the top left corner of the display may turn off.

A displaywindow in the cold zone continues to respond to touch input. The display of a displaywindow in the cold zone is powered off when not interacted with and, similar to printed documents, does not consume energy. Displays are powered back on when they are picked up, touched by another displaywindow, or updated externally.

FIG. 2b shows one way for the display devices to interact with each other. In this case, a first display device 12 in the warm zone is being connected to a second display device 10 in the hot zone. Such interactions provide convenient focus and context navigation of content on hot, warm, or cold displaywindows via the second displaywindow. When a hot displaywindow is moved into another zone during this interaction, it remains hot as long as the user holds the displaywindow.

As shown, a user is pointing the top left corner of the hot displaywindow onto the thumbnail on the underlying warm or cold displaywindow. This action causes the hot displaywindow to shows a full screen preview of the thumbnail. This is the functional equivalent of magic lenses [28], hyperlink previews, or contextual menus in GUIs. After previewing the item, the user can move it permanently onto the hot displaywindow by lifting the display device and pulling it into the hot zone [28], preserving the detailed view. Users can also point a hot display device into another hot displaywindows to access information within a document being display on that window. For example, pointing at a URL in a document on one hot displaywindow shows a full-screen preview of the webpage on the other hot displaywindow. Pointing at a location on a map or an item in a book's table of contents may pop up a linked page on the second screen. This technique provides an interesting alternative to the Pick and Drop technique [26], for multiple displays.

As set out above, display devices in the cold zone may be used to file documents. These document files may be opened by pointing an empty displaywindow at the display of a device in the cold zone. The pointing action will trigger a display of a list of document file icons within a folder to be represented on a display of a device in the cold zone. During pointing, the hot displaywindow shows a thumbnail overview of the contents of the file document. The file can be opened by selecting one of these thumbnails.

The interaction between devices may also be used to move documents between devices. For example, in the cold zone, file icons can be moved between folders by pointing at their thumbnail, picking them up onto the hot displaywindow, and then tapping a third displaywindow. When a user points with a hot displaywindow at an empty space within a file folder in the cold zone, its document is closed and the thumbnail is moved into the filing folder. This closes the displaywindow, emptying its screen.

Users can also copy or move documents and data objects within documents via this technique. This action is equivalent to using a GUI clipboard for cutting, copying and pasting files. For example, this way users can add an attachment to an email displayed on one displaywindow by tapping its empty space with a pdf document on another displaywindow. Alternatively, users can move a data object between two displaywindows by placing them adjacent to each other, then dragging the data object from one display to the other with a finger.

Co-location of display devices may also be used to provide interaction between the devices. For example, if an empty displaywindow is placed directly adjacent to and slightly overlapping with a displaywindow (e.g. one in the hot zone displaying a document), the apparatus responds by creating a larger view of the original document across the two displays [14,16]. Alternatively, items can be moved or copied between two co-located displaywindows by dragging them via touch.

If co-located displaywindows are moved away from each other, they will display a subset of the larger graphics environment that is framed by the two displays [9]. This allows browsing of large graphics documents using multiple displaywindows as magic lenses as described above with reference to FIG. 2b. Thus, if one displaywindow containing a map is co-located with another, the map expands to encompass the area next to it. If the second displaywindow is now moved away, the view of that displaywindow will automatically scroll to the relative distance from the original displaywindow, thus revealing other areas. This can be useful when planning detailed routes between an origin and destination city. This feature is also useful for browsing large graphical documents, such as architectural drawings, across the entire desk space without zooming.

Co-located displaywindows may be disconnected again using a tear gesture. One implementation of the tear gesture is by bending the top left corner of the right displaywindow upwards while moving the display upwards. Upon tearing, two separate documents are created, each containing the data objects on display. In the case of the map example, this would, e.g., produce one displaywindow with the origin city, and one with the destination city.

The apparatus may further comprise a keyboard, e.g. a standard wireless Bluetooth keyboard, for a user to edit text. The location of the keyboard on the desk is may be tracked, and input may be automatically routed to the display device that is closest to the keyboard. Users can tie the keyboard to a particular displaywindow by hitting a function key on the keyboard while the keyboard is adjacent to the particular displaywindow. When users subsequently move the displaywindow, input continues to be directed to it.

Another method for inputting information into the display device is by bending the device. For example, individual displaywindows may respond to bends on the top left and right corners of the display, as well as the full display.

According to Lahey et al. [18] users have a preference for top corner bends over bottom corner bends. Building upon these results, the following bend gestures may be incorporated in the invention:

Bidirectional top-right corner bends for navigation, and
Bidirectional top-left corner bends for application-specific tasks (e.g., the tear gesture to unlink two co-located displaywindows, or to reply to an email).
Full display bends are used for zooming in and zooming out.

A downward top-right corner bend selects the next tabbed document or pages forward, while an upward top-right corner bend pages back [35]. Bends are also used to scroll through lists that are larger than fit the physical display. Bends performed across two displaywindows copy the selected information from the top to the bottom displaywindow. Users can stack displaywindows and bend the top right corners inwards with a single gesture to create a file folder containing the contents of each of the displaywindows: the folder appears on the top displaywindow and the other displaywindows become empty.

Thus, in summary, interactions with displaywindows occur through touch, keyboard, bending, proximity (to other displaywindows, to the desk, and to the user), as well as by pointing between two displaywindows.

Figure 3:
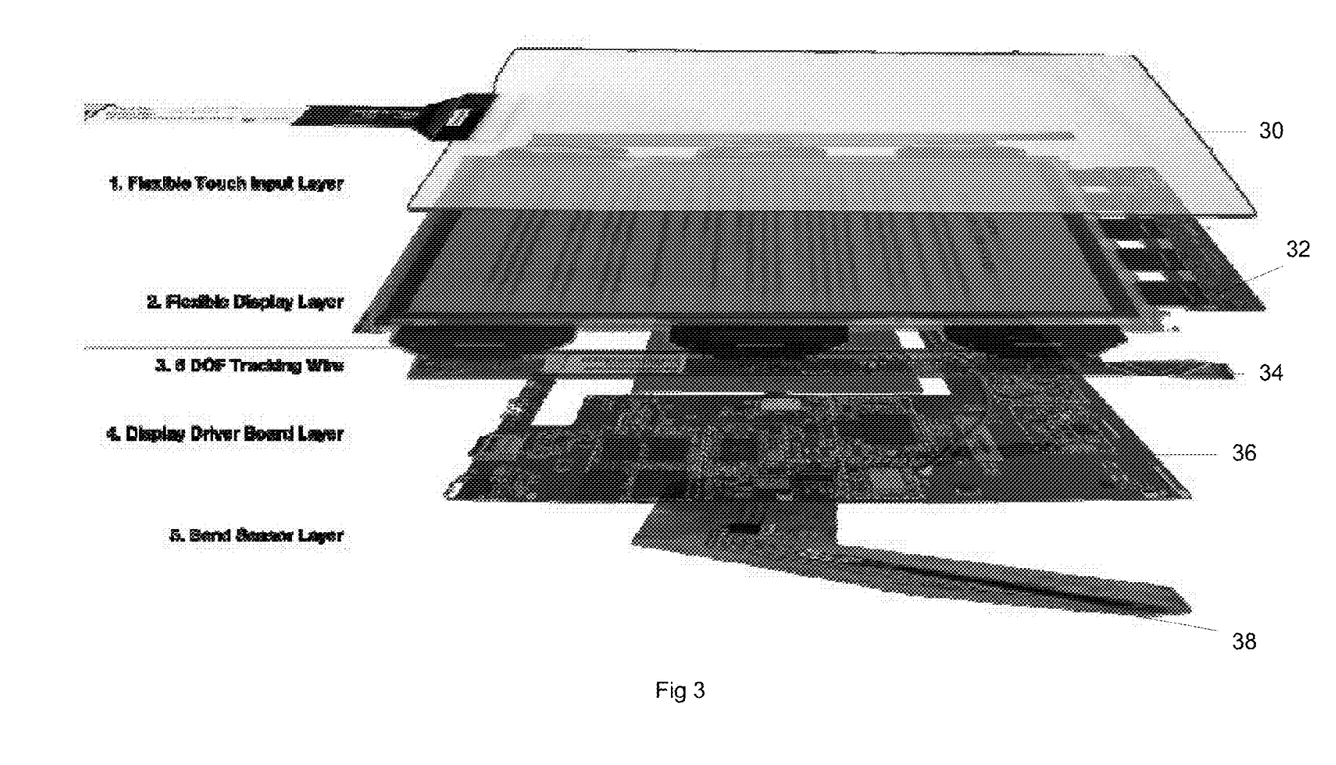

FIG. 3 shows an exploded view of a display device for use in the apparatus described above. The device comprises multiple layers some of which are flexible and some of which are semi-flexible so that the overall device itself is generally flexible. The top layer is a flexible capacitive touchscreen 30. The second layer is a flexible electrophoretic display 32. The third layer provides a tracking sensor 34, while the fourth layer contains a semi-flexible wireless display driver board 36. The fifth layer is a sensor 38 for sensing bending of the corners of the display. The final layer (not shown) is a circuit that allows capacitive coupling between displaywindows for pointing. In one embodiment, the display device may be approximately 3 mm thick and weigh approximately 70 g. Each display device may also be a fully functional Android computer that only communicates with a host PC for input and to coordinate data exchanges with other displaywindows. More detail for suitable embodiments of the various layers is set out below.

The flexible capacitive touchscreen 30 of the first layer may be a flexible, thin-film, transparent Zytronic capacitive touch screen [36]. The screen may be 10" in size diagonally. This layer is connected to a host PC with a ribbon cable, via which it issues touch events to the application software running on the displaywindow. The touch screen is adapted to enable multi-display pointing as described above. The capacitive circuit has been developed so that when the displaywindow is held by a user's hand, this transfers the user's capacitance to a soldered tip on the top left corner of the displaywindow. This activates touch events upon one displaywindow touching another.

The flexible electrophoretic display 32 of the second layer may feature a large 10.7" diagonal flexible electrophoretic display with a minimal bezel. The techniques for creating such a display are described in previous applications to the present applicant, all hereby incorporated by reference in their entirety for all purposes, for example in WO 01/47045, WO 2004/070466, WO 01/47043, WO 2006/059162, WO 2006/056808, WO 2006/061658, WO 2006/106365 and PCT/GB2006/050265.

In this example, the display features a resolution of 1280×960 pixels, with a full-screen refresh rate of 700 ms. The display is powered through a flexible battery on the semi-flexible driver board underneath the display. The driver board, running a custom Android application, is connected over Wifi to a PC underneath the desk, which supplies sensor data updates for each displaywindow. The display features a small light emitting diode (LED) that is used for notification purposes.

An electro-magnetic sensor mounted on each display device allows tracking of location and orientation relative to the other display devices, as well as the desk and the user. In one embodiment, the sensor is a small trakSTAR sensor probe that is attached via a wire to a processor box placed underneath the desk [1]. The sensor together with the processor box thus form a sensing device which determines the proximity zone (hot, cold, warm) within which the display device is located.

While displaywindows could easily be tracked wirelessly via computer vision systems currently available (e.g., Vicon, Kinect) [16], the implementation shown uses a wired configuration for the following reasons. Firstly, computer vision systems suffer from occlusion, making it difficult to track displaywindows when they overlap. Secondly, an electromagnetic solution appears to provide a better value proposition for production models. Finally, the electromagnetic sensor provides greater resolution in all 6 directions of freedom (DOF).

The sensing apparatus translates the 6 DOF coordinates of each displaywindow to determine the location of a displaywindow relative to the user, relative to the desk, and relative to other displaywindows. A displaywindow is hot when it is lifted from the table, or when it is within arms length (70 cm) from the user. A displaywindow is warm when it is on the desk between 70 cm and 110 cm from the user. All other displaywindows are cold, with their displays powered off. The sensing apparatus also determines when displaywindows are co-located, and tracks the distance between tracking sensors on each device when connected displaywindows are moved apart. Finally, the sensing apparatus determines when displaywindows are stacked on the basis of their z coordinate determined by each electromagnetic sensor of each display device.

The display driver board of the fourth layer may be a custom Plastic Logic Apollo board [24] running Android and featuring an 800 MHz ARM Cortex-A8 processor, full graphics subsystem as well as a Wifi connection. The board maintains its own state, application data, and power to the display without tethering to an external computer. The Android applications running on the driver board obtain touch and bend input, as well as location information for the displaywindow from a host PC, over a Wifi connection. Although elements of the Apollo board are rigid, a modular mounting strategy allows flexing of the entire display surface of approximately 15° in both directions, and 30° at its corners where the bend sensors are located. This layer also contains a flexible lithium-polymer battery that powers both display and driver board.

The fifth layer comprises a bend sensitive layer which may use 2 bi-directional FlexPoint [10] bend sensors mounted on a custom-built flexible circuit board mounted directly underneath the display driver board. Bend sensors are connected via a flat ribbon cable to an Arduino Mega 2560 prototyping board that may communicate with the host PC for processing bends.

The bottom layer features only a small wire connected to a small metal tip that transfers the capacitance of the user's hand to another displaywindow for the purpose of activating the Zytronic touch film. This is used for focus+context pointing with one displaywindow onto another as described in relation to FIG. 2b.

Examples of tasks which can be undertaken by the system include:
a) Document management: for example
  (1) pick up a text document by pointing a hot displaywindow at a cold displaywindow's file icons.
  (2) co-locate an empty displaywindow next to the hot displaywindow to extend the document's view.
b) Photo browsing: for example
  (1) move a warm displaywindow with photo thumbnails to the hot zone and open a photo for fullscreen view using both touch and fullscreen bend input;
  (2) move this displaywindow back to the warm zone to go back to a thumbnail overview;
  (3) co-locate an empty displaywindow to drag and drop photos from one displaywindow to the other;
  (4) pick up photos from a warm displaywindow by pointing with an empty hot displaywindow.
c) Answering Email: for example
  (1) open an Inbox by pointing at an email icon in a cold displaywindow with a hot displaywindow;
  (2) open an email by pointing at the warm displaywindow with the Inbox overview with an empty hot displaywindow;
  (3) navigate to the next email using a top right corner bend;
  (4) bend the top left corner to compose a reply;
  (5) type a reply using the keyboard
  (6) attach a pdf document by pointing its displaywindow below the reply
  (7) send the reply by bending the top left corner.
d) Route Planning: for example
  (1) open a map application by pointing at the map icon on a cold displaywindow using a hot displaywindow;
  (2) use touch to scroll to a specified originating city;
  (3) co-locate a second, empty displaywindow;
  (4) move the second displaywindow around the desk to find a specified destination city;
  (5) unlink the displays via a top left corner tear gesture.

Variations or alternatives to the example described above are discussed below.

The warm zone may also comprise display devices which may not need to be accessed for several days, for example, these display devices (cold devices) may be stacked beneath another display located in the warm zone. This may be detected by the sensing device which determines the location of a display device within the warm zone and then determines that the display device is behind another display device. The sensing device may then determine that the display device is effectively in the cold zone, i.e. in a different zone to that which is initially determined from the location data.

Additional zone-based interactions may also be incorporated. For example, an additional proximity zone, e.g. an "outbox zone", may be defined and displaywindows could be placed in this zone to cause the currently open email to be sent. Different zones may also be used for different document types. For example, a video could be played full screen in the hot zone, paused in the warm zone, and appear as a thumbnail with a description in the cold zone. However, at the same time, users appreciated the one-directionality of view changes for hot displaywindows. It appears that automated view changes based on proximity are a balancing act of allowing easy overview of information while keeping the user in control of the view.

The pointing functionality (e.g. as described in relation to FIG. 2b) may be extended to provide the functionality often given by dragging. Dragging involves friction and often required the user to bend over the display. Pointing with a displaywindow was considered easier by the participants because they did not have to worry about accidentally releasing a drag operation in the wrong location (despite the fact that objects would snap back upon erroneous release) and generally required less effort. Pointing with a display appears to require less focus and fewer fine motor movements than dragging.

However, pointing with the edge of a displaywindow could be challenging depending on the location of, and grasp on, the display devices. The displaywindow used as a pointing device sometimes occluded the other displaywindow, requiring the user to reposition their body. Accordingly, an activator may also be included at the right corner of the device because less movement would often be required if this functionality was added.

Although most of the functionality of the displaywindows is self-contained, displaywindows such as those used in FIG. 1al suffer from wired tethering to the host processor, which is only used for the purposes of processing input from the displaywindows. Such tethering generally does not seem to interfere with interacting with the apparatus. The need for tethering may be removed by introducing processing of touch, bend and tracking operations on the displaywindow itself.

Displaywindows could also be thinner, and more flexible. As shown in FIG. 3, the driver board is sandwiched between the layers of the display device rather than tether separately. The driver board contains rigid components which affects the overall flexibility of the device. Reducing the size of rigid components on this board may increase flexibility and also the rigid component may be placed into separate component, e.g. islands, that are connected to the main board with flexible cables.

Each of the references set forth above by identifying numbers (e.g., [1]-[36]) are incorporated herein by reference for all purposes. A detailed bibliography of the references is set forth below:

1. Ascension, Inc. trakSTAR. http://www.ascension-tech.com/medical/trakSTAR.php (i.e., reference [1])
2. Agrawala, A., and R. Balakrishnan. Keepin' it Real: Pushing the Desktop Metaphor with Physics, Piles and the Pen. In *Proc. CHI'06*, ACM Press (2006), 1283-1292. (i.e., reference [2]).
3. Baudisch, P., Good, N., Bellotti, V., and Schraedley, P. Keeping things in context: a comparative evaluation of focus plus context screens, overviews, and zooming. In *Proc. CHI*, ACM (2002), 259-266. (i.e., reference [3]).
4. Bier, E. a, Stone, M. C., Pier, K., Buxton, W., and DeRose, T. D. Toolglass and magic lenses: the see-through interface. Proc. SIGGRAPH, (1993), 73-80. (i.e., reference [4]).
5. Bush, V. As We May Think. The Atlantic Monthly 176, 1 (1945), 101-108. (i.e., reference [5]).
6. Cockburn, A. and McKenzie, B. Evaluating the effectiveness of spatial memory in 2D and 3D physical and virtual environments. Proc. CHI, (2002), 203. (i.e., reference [6]).
7. Cockburn, A. Revisiting 2D vs 3D implications on spatial memory. Proc. AUIC, (2004), 25-31. (i.e., reference [7]).
8. Fitts, P. M. The information capacity of the human motor apparatus in controlling the amplitude of movement. J Exp Psychol 47, 6 (1954), 381-391. (i.e., reference [8]).
9. Fitzmaurice, G. W. Situated information spaces and spatially aware palmtop computers. Communications of the ACM 36, 7 (1993), 39-49. (i.e., reference [9]).
10. FlexPoint Inc. http://www.flexpoint.com (i.e., reference [10]).
11. Girouard, A., Tarun, A., and Vertegaal, R. DisplayStacks: interaction techniques for stacks of flexible thin-film displays. In *Proc CHI'12*. (2012). ACM, New York, N.Y., 2431-2440. (i.e., reference [11]).
12. Greenberg, S., Marquardt, N., Ballendat, T., Diaz-Marino, R., and Wang, M. Proxemic interactions: the new ubicomp? interactions 18, 1 (2011), 42-50. (i.e., reference [12]).
13. Guimbretiere, F. Paper augmented digital documents. Proc. UIST 5, 2 (2003), 51-60. (i.e., reference [13]).
14. Hinckley, K., Ramos, G., Guimbretiere, F., Baudisch, P., and Smith, M. Stitching: pen gestures that span multiple displays. Proc. AVI, (2004), 23-31. (i.e., reference [14]).
15. Hinckley, K., Yatani, K., Pahud, M., et al. Pen+Touch=New Tools. Proc. UIST, (2010), 27-36. (i.e., reference [15]).
16. Holman, D., Vertegaal, R., Altosaar, M., Troje, N., and Johns, D. PaperWindows: Interaction Techniques for Digital Paper. Proc. CHI, (2005), 591-599. (i.e., reference [16]).
17. Khalilbeigi, M., Steimle, J., and Mühlhäuser, M. Interaction techniques for hybrid piles of documents on interactive tabletops. Proc. CHI extended abstracts, (2010), 3943. (i.e., reference [17]).
18. Lahey, B., Girouard, A., Burleson, W., and Vertegaal, R. PaperPhone: Understanding the Use of Bend Gestures in Mobile Devices with Flexible Electronic Paper Displays. Proc. CHI, (2011). (i.e., reference [18]).
19. Lee, J. C., Hudson, S. E., and Tse, E. Foldable interactive displays. Proc. UIST, (2008), 287. (i.e., reference [19]).
20. Luff, P., Heath, C., Norrie, M., Signer, B., and Herdman, P. Only touching the surface: creating affinities between digital content and paper. Proc. CSCW, (2004), 523. (i.e., reference [20]).
21. Mackay, W. E., Pothier, G., Letondal, C., Bøegh, K., and Sorensen, H. E. The missing link: Augmenting Biology Laboratory Notebooks. Proc. UIST, (2002). (i.e., reference [21]).
22. Merrill, D., Kalanithi, J., and Maes, P. Siftables: towards sensor network user interfaces. Proc. TEI, (2007), 75-78. (i.e., reference [22]).
23. Mine, M. R., Brooks, F. P., and Sequin, C. H. Moving objects in space: exploiting proprioception in virtual-environment interaction. Proc. SIGGRAPH, (1997), 19-26. (i.e., reference [23]).
24. Plastic Logic Inc. (2012). http://www.plasticlogic.com (i.e., reference [24]).
25. Reilly, D., Rodgers, M., Argue, R., Nunes, M., and Inkpen, K. Marked-up maps: combining paper maps and electronic information resources. Personal and Ubiquitous Computing 10, 4 (2005), 215-226. (i.e., reference [25]).
26. Rekimoto, J. Pick-and-Drop: A Direct Manipulation Technique for Multiple Computer Environments. Proc. UIST, (1997), 31-39. (i.e., reference [26]).
27. Rekimoto, J., Ullmer, B., and Oba, H. DataTiles. Proc. CHI, (2001), 269-276. (i.e., reference [27]).
28. Rohs, M., Oulasvirta, A., and Suomalainen, T. Interaction with magic lenses: real-world validation of a Fitts' Law model. Proc. CHI, (2011), 2725-2728. (i.e., reference [28]).

29. Schwesig, C., Poupyrev, I., and Mori, E. Gummi: a bendable computer. Proc. CHI, (2004), 263-270. (i.e., reference [29]).
30. Sellen, A. J. and Harper, R. H. R. The Myth of the Paperless Office. MIT Press, 2003. (i.e., reference [30]).
31. Terrenghi, L., Kirk, D., Sellen, A. J., and Izadi, S. Affordances for manipulation of physical versus digital media on interactive surfaces. Proc. CHI'07, (2007), 1157-1166. (i.e., reference [31]).
32. Vertegaal, R. and I. Poupyrev. Organic User Interfaces: Introduction to Special Issue *Comm of the ACM* 51(6), (2008), 26-30. (i.e., reference [32]).
33. Ullmer, B., Ishii, H., and Jacob, R. J. K. Token+ constraint systems for tangible interaction with digital information. TOCHI 12, 1 (2005), 81-118. (i.e., reference [33]).
34. Wellner, P. Interacting with paper on the DigitalDesk. Communications of the ACM 36, 7 (1993), 87-96. (i.e., reference [34]).
35. Wightman, D., Ginn, T., and Vertegaal, R. BendFlip: Examining Input Techniques for Electronic Book Readers with Flexible Form Factors. Proc. INTERACT, (2011). (i.e., reference [35]).
36. Zytronic, PLC. (2012). http://www.zytronic.co.uk (i.e., reference [36]).

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. Apparatus for displaying a plurality of electronic documents to a user, the apparatus comprising:
a display device having a display operable to display an electronic document;
at least one sensing device operable to determine the location of the display device relative to a desk, wherein the desk includes at least a first proximity zone on the desk and a second proximity zone on the desk; and
wherein the functionality of the display device is modified to exhibit a first functionality that is specific to the first proximity zone on the desk when the display device is located on the first proximity zone on the desk and in contact with the desk;
wherein the functionality of the display device is modified to exhibit the first functionality that is specific to the first proximity zone on the desk when the display device is located above the first proximity zone on the desk without contact with the desk;
wherein the functionality of the display device is modified to exhibit a second functionality that is specific to the second proximity zone on the desk when the display device is located on the second proximity zone on the desk and in contact with the desk;
wherein the functionality of the display device is modified to exhibit the second functionality that is specific to the second proximity zone on the desk when the display device is located above the second proximity zone on the desk without contact with the desk; and
wherein the first functionality is different from a second functionality.

2. The apparatus according to claim 1, wherein the display device comprises a thin-film display.

3. The apparatus according to claim 2, comprising an electrophoretic display.

4. The apparatus according to claim 1, wherein the first proximity zone comprises all areas on the desk within 70 cm of the user.

5. The apparatus according to claim 1, wherein the display device is within the first proximity zone when the at least one display device is being held by the user.

6. The apparatus according to claim 1, wherein the second proximity zone comprises all areas on the desk between 70 cm to 110 cm away from the user.

7. The apparatus according to claim 1, wherein the display device is configured to allow a user to edit a document displayed on said display when the display device is within the first proximity zone.

8. The apparatus, according to claim 1, wherein the display device is configured to lock a document when the display device is within the second proximity zone.

9. The apparatus according to claim 8, wherein the display device is movable relative to the desk.

10. The apparatus according to claim 1, wherein the display device is configured to turn off said display when the display device is within the second proximity zone.

11. The apparatus according to claim 10, wherein the display device is movable relative to the desk.

12. The apparatus according to claim 1, wherein the desk comprises a third proximity zone which is located further from the user than the second proximity zone.

13. The apparatus according to claim 12, wherein the display device is configured to turn off said display when the display device is within the third proximity zone.

14. The apparatus according to claim 1, wherein the display device comprises an indicator to show within which proximity zone the display device is located.

15. The apparatus according to claim 14, wherein the indicator comprises a first colored light for said first proximity zone and a second colored light for said second proximity zone.

16. The apparatus according to claim 1, wherein the resolution of a document displayed on the display is determined by a particular proximity zone within which the display device is located, said particular proximity zone being either the first proximity zone or the second proximity zone.

17. The apparatus, according to claim 16, wherein the display device is configured to display file thumbnails for said document when the display device is in the second proximity zone.

18. The apparatus according to claim 16 or claim 17, wherein the display device is configured to display a full page of said document when the display device is in the first proximity zone.

19. The apparatus according to claim 16, wherein the resolution of a document displayed on the display device is changed when the display device moves from the first proximity zone to the second proximity zone.

20. The apparatus according to claim 16, wherein the resolution of a document displayed on said display device is unaltered when the display device moves from the second proximity zone to the first proximity zone.

21. The apparatus according to claim 1, further comprising a keyboard.

22. The apparatus according to claim 1, wherein the display device is flexible and comprises a bending sensor for sensing bending of said flexible display device.

23. The apparatus according to claim 22, wherein in response to bending of said flexible display device, said display device is configured to enlarge content displayed on said display device.

24. The apparatus according to claim 22, wherein in response to bending a corner of said flexible display device, said display device is configured to display a subsequent page of a document which is being displayed on said display.

25. The apparatus according to claim 1, wherein the sensing device comprises a location sensor on the at least one display device and a sensing processor on the desk to process data received from the sensor.

26. The apparatus, according to claim 1, wherein the display device comprises a user input in the form of a touch sensitive screen.

27. The apparatus according to claim 26, wherein the touch sensitive screen is connected to an activator whereby when a user holds the display device and touches the display device to a second display device, the activator activates the touch sensitive screen of the second display device.

28. The apparatus according to claim 26 or claim 27, wherein the touch sensitive screen is a capacitive sensor.

29. The apparatus according to claim 1, wherein the display device is a first display device, wherein the first display device comprises a proximity sensor for determining when the first display device is adjacent a second display device and wherein the second display device comprises a display for displaying information relating to a document on the first display device when the second display device is adjacent first display device.

30. The apparatus according to claim 29, wherein the proximity sensor is in the form of a touch sensor and the second display device comprises an activator for activating the touch sensor when a user is holding the second display device.

31. The apparatus according to claim 1, wherein the display device is a first display device, the apparatus further comprising:
a second display device, wherein the functionality of the second display device is modified to exhibit the second functionality that is specific to the second proximity zone on the desk when the second display device is located either on the second proximity zone on the desk or above the second proximity zone on the desk.

32. The apparatus according to claim 31, wherein the at least one sensing device determines the proximity of the first display device to the second display device.

33. The apparatus according to claim 31, further comprising a keyboard, and wherein the at least one sensing device determines which of the first display device or second display device is closest to the keyboard, wherein actions on the keyboard are input to said closest display device.

34. The apparatus, according to claim 31, further comprising a keyboard, and wherein the keyboard comprises an input for linking said keyboard to a linked display device, wherein actions on the keyboard are input to said linked display device.

35. The apparatus according to claim 1, the apparatus further comprising:
the desk.

36. The apparatus according to claim 35, wherein the desk comprises a processor which is configured to receive and process inputs from the display device.

37. The apparatus according to claim 35, wherein the at least one sensing device comprises a location sensor on the display device and a sensing processor on the desk to process data received from the sensor, the desk comprises a processor which is configured to receive and process inputs from the display device and the sensing processor which is configured to receive and process inputs from the display device and wherein the processor which is configured to receive and process inputs from the display device is further configured to send coordinate data to the display device.

38. The apparatus according to claim 35, wherein the display device is flexible and comprises a bending sensor for sensing bending of said flexible display device, the desk comprises a processor which is configured to receive and process inputs from the display device, and the bending sensor is configured to send bending data to the processor which is configured to receive and process inputs from the display device and wherein the processor which is configured to receive and process inputs from the display device is further configured to process said bending data and send instructions to the display device to alter the display based on said processed bending data.

39. The apparatus according to claim 1, wherein the functionality of the display device is modified to exhibit the first functionality only when the display device is located either on the first proximity zone on the desk or directly above the first proximity zone on the desk.

40. The apparatus according to claim 1, wherein the first proximity zone which is closer to a user of the apparatus than the second proximity zone is to the user.

* * * * *